3,007,775
PRODUCTION OF FERRIC OXIDE
David M. Llewelyn, Clydach, Swansea, and De Witt H. West, Port Eynon, Swansea, Wales, assignors to The International Nickel Company, Inc., New York, N.Y., a corporation of Delaware
No Drawing. Filed Mar. 5, 1959, Ser. No. 797,331
Claims priority, application Great Britain Nov. 14, 1958
4 Claims. (Cl. 23—200)

The present invention relates to the production of metal oxides, and more particularly, to a new and improved process for producing a substantially pure ferric oxide ($Fe_2O_3$) suitable for use in the production of ferrites.

As is known to those skilled in the art, ferric oxide ($Fe_2O_3$) of relatively high purity is required in finely divided form for the production of ferrites. It is known that such an oxide can be prepared by precipitating ferric hydroxide from ferric chloride or nitrate and then dehydrating the resulting washed precipitate. However, this method is successful only if the precipitate is exhaustively washed from adsorbed solids, which is a lengthy, costly and difficult procedure. Attempts to avoid this roundabout method by direct roasting of fine iron powder in air were unsuccessful because of the severe sintering which takes place, giving rise to incomplete oxidation. Such a product consisted of a mixture of metallic iron and magnetic oxide of iron, $Fe_3O_4$.

Further attempts to overcome the foregoing difficulties by mixing the fine iron powder with ferric oxide ($Fe_2O_3$) prior to roasting were unsuccessful, as the resulting product always contained too much $Fe_3O_4$. It has also been proposed to produce the oxide by heating iron powder with steam at 400° C. or above for a substantial period of time, e.g., for 6 hours, and thereafter subjecting the product so formed to prolonged milling in water. The milled product is then converted to ferric oxide by calcining at 500° C. Such a process is rather tedious and cumbersome.

It has now been discovered that ferric oxide of a relatively high degre of purity can be produced economically and with facility. Moreover, it has been found that the ferric oxide produced in accordance with the invention is highly reactive with other materials in the production of ferrites.

It is an object of the present invention to provide a new and improved process for producing ferric oxide of high purity.

Another object of the invention is to provide a new and improved process for the production of ferric oxide which can be conducted economically and with facility and which results in a reactive ferric oxide of high purity.

Other objects and advantages will become apparent from the following description.

Generally speaking, the present invention contemplates providing economically and with facility ferric oxide having a high level of purity and possessing the property of being very reactive with other materials in the production of ferrites. In accordance with the present invention, ferric oxide is produced by immersing iron particles in water to form a slurry, controlling the temperature of said slurry such that it does not fall below a temperature of about 75° C., partially and superficially oxidizing the said iron particles to a hydrated oxide by treating said slurry with an oxygen-containing gaseous mixture and then calcining the product thus formed. As a result of the partial oxidation operation, a skin of hydrated oxide is formed at least substantially about the iron particles and the particles thus formed coagulate into a cake which is then calcined. At the end of the partial oxidation period, excess water can be removed by filtration or otherwise to form a cake which is then calcined. It is most advantageous and highly preferred in obtaining satisfactory results that the gaseous mixture be comprised of carbon dioxide and air. Moreover, it has been found especially beneficial in achieving optimum results that the ratio of carbon dioxide to air by volume be not substantially less than 1 to 40. No prolonged and tedious milling operation is necessary in accordance with the invention prior to the calcining step and this is an important commercial feature of our invention.

One of the important advantages of the present invention is that as a result of the partial oxidation treatment under controlled temperature conditions, detrimental sintering during the calcining treatment is avoided and there is thus provided a product comprised substantially entirely of red ferric oxide in a fine state of division and which is sufficiently free of metallic iron and magnetite ($Fe_3O_4$). As referred to hereinbefore, the direct roasting of iron powder was found objectionable because sintering of the iron particles took place which led to incomplete oxidation and an unsatisfactory product.

In carrying the invention into practice, the starting powder can advantageously be that produced by the decomposition of iron carbonyl and commonly known as carbonyl iron powder, although other iron powders can be suitably employed. It is advantageous to use carbonyl iron because it can be obtained in a high state of purity and a reasonably uniform fine state of division. Moreover, the nitrogen and carbon contents in the carbonyl iron powder are readily reduced during calcination. Carbonyl iron powder, as known to those skilled in the art, is produced in various grades in which the particle size and carbon and nitrogen contents vary. These grades include one commonly known as "E" of mean particle size of about 5 microns and carbon content of about 0.6%; a grade commonly known as "DF" of mean particle size of about 3 microns and of carbon content of about 1.0%; decarburized "DF" grade of mean particle size of about 3.5 microns and of carbon content of about 0.02%; and a grade known as "B" which is of small mean particle size, approximately 2.5 microns, and low bulk density, and resembles cotton wool, having a carbon content of about 0.6%. All these grades of carbonyl iron powder may be used, but it is advantageous and preferred to employ the grade having the smallest particle size, e.g., "DF" or "B." In any event, for best results the particle size should not exceed about 6 microns since powders of coarser particle size oxidize at a slower rate. Iron powders of a particle size of about 3 microns or less are much preferred and are advantageous since it is considered that such finer powders yield a more pyrophoric intermediate material than coarsesr particles, thus giving higher powder bed temperatures during calcination and thereby contributing to lower carbon contents in the final product.

As referred to hereinbefore, the ratio of $CO_2$ to air in the gaseous mixture should not be less than 1 to 40. While lower ratios could perhaps be used, the oxidizing reaction might proceed too slowly from a commercial viewpoint. Thus, the ratio of $CO_2$ to air in the gaseous mixture should be high, say 1:5, if the best oxide is to be produced, but good products are obtained with lower $CO_2$ to air ratios, e.g., 1:20. Although, the ratio of carbon dioxide to air could be higher than about 1 to 5, such ratios lead to added production costs, particularly if the total volume of air required was the same. Table I below shows the results obtained in a series of five tests in which the only variant was the $CO_2$ to air ratio. The process was carried out in each test by introducing the gas mixture into a vessel containing a stirrer by which the iron powder was continuously stirred while immersed in water maintained at 80° C. The powder was of "E"

grade having a particle size of 4.45 microns and contained 0.81% carbon and 0.54% nitrogen. The gas mixture was passed through the vessel at an average rate of 100 litres per hour for each 100 grams of carbonyl iron powder for a period of 6 hours. The contents of the vessel were then filtered to yield a wet cake, which was calcined in air at 500° C. The results were as follows:

*Table I*

| Ratio of $CO_2$ to Air | Calcined Product | | Color |
|---|---|---|---|
| | Percent Fe | Percent C | |
| No $CO_2$ | 95.1 | 0.67 | Blue-black. |
| 1:40 | 72.0 | 0.045 | Red. |
| 1:20 | 72.2 | 0.047 | Do. |
| 1:10 | 71.1 | 0.047 | Do. |
| 1:5 | 70.7 | 0.025 | Do. |

The temperature of the wet treatment may vary but a temperature of at least 80° C. is preferred and is desirable as is shown by the results, in Table II below, obtained in tests of 6 hours' duration in the oxidation cycle and using a ratio of $CO_2$ to air of 1:20, the conditions being as before described except for variation in the temperature.

*Table II*

| Temperature, ° C., of Wet Treatment | Calcined Product | |
|---|---|---|
| | Percent Fe | Percent C |
| 20 | 76.8 | 0.15 |
| 50 | 74.8 | 0.063 |
| 80 | 72.2 | 0.047 |

Temperatures as low as 75° C. can be employed as indicated hereinbefore. Lower temperatures tend to reduce the rate of reaction and the purity of the product. It has been found that the temperature of the wet treatment be not greater than about 95° C. because of the influence exerted by the injection of cold gaseous mixtures during processing. The amount of water used in forming a slurry can be, for example, in the ratio of two parts of water to one part of powder by weight. Of course, other ratios of water to powder can be employed. However, ratios lower than 2:1 of water to powder yield thick slurries and make processing difficult and while higher ratios can be used, it is desirable to obtain maximum output from minimum plant capacity.

The particle size of the starting powder should be, as indicated hereinbefore, as fine as possible. Under a temperature of 80° C. and a ratio of carbon dioxide to air of 1:20 the following comparative results were obtained:

*Table III*

| Powder Grade | Particle Size, Microns | Initial Composition | | Final Calcined Product | | Color |
|---|---|---|---|---|---|---|
| | | Percent C | Percent N | Percent Fe | Percent C | |
| "DF" | 2.93 | 1.26 | 2.0 | 70.9 | 0.14 | Bright Red. |
| Decarburized "DF". | 3.75 | 0.014 | | 70.9 | .016 | Do. |
| "E" | 4.45 | 0.81 | 0.54 | 72.2 | .047 | Red. |

Under the conditions stated, a temperature of 80° C. is required for satisfactory conversion but this may be advantageously increased to 95° C. Further, it will be seen from Table III that the finer parent iron powders gave more highly colored products. The carbon content of the original powder does not seem to affect the properties of the red iron oxide.

The wet cake obtained is highly reactive and free access to air is all that is required during the roasting, in which the furnace temperature need not exceed 500° C. although temperatures in the range of 300° to 800° C. can be used in the roasting process. However, it is preferred that the maximum temperature not exceed 750° C. in order that a product of high purity be obtained, especially where a pure product of small particle size is required.

For ferrite production a very fine powder is required and the iron oxide produced according to the invention can advantageously be heavily milled and then sieved to remove coarse particles.

It is to be observed that the present invention provides a process for the production for a relatively pure and highly reactive ferric oxide. The high purity level of the ferric oxide makes it suitable for use in the manufacture of ferrites. In the production of ferrites, the ferric oxide should contain less than 0.001% of each of the following elements: calcium, aluminum, magnesium, chromium, lead, barium, sodium, potassium and strontium. Residual amounts of other elements or impurities should be less than 0.2% and preferably less than 0.1%. Analyses of ferric oxides produced from a starting material of carbonyl iron has shown that ferric oxides of the invention contain less than 0.1% nickel, e.g., less than 0.05% nickel, less than 0.03% carbon and less than 0.01% of each of the elements copper, zinc and silicon. It is to be understood that pure iron carbonyl powder would yield a nickel-free product. Less than 0.001% of each of the elements calcium, aluminum, magnesium, etc., listed above were present in ferric oxides produced in accordance with the invention. Further, X-ray analysis of products produced in accordance with the invention have shown them to be in a fine state of division and of a single phase nature.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. For example, as will be readily understood by those skilled in the art, when using molecular oxygen rather than air as the oxygen-containing gas in the partial oxidation step, the volume of molecular oxygen should be approximately one-fifth of the volume of air required.

We claim:

1. A process for producing ferric oxide characterized by a relatively high degree of purity and further possessing the property of being highly reactive with other materials in the production of ferrites which comprises, forming a slurry by immersing in water particles of iron powder of a size of not greater than about 6 microns and produced by the decomposition of iron carbonyl, controlling the temperature of said slurry such that it does not fall below a temperature of about 75° C. nor exceed a temperature of about 95° C., partially oxidizing said iron particles until at least a skin of hydrated oxide is formed substantially about the iron particles by treating said slurry with a gaseous mixture comprised of carbon dioxide and air, the ratio of said carbon dioxide to air by volume being not greater than about 1 to 5 and not less than about 1 to 40 so that when the product thus formed is subjected to a calcining operation detrimental sintering is avoided, and then calcining the product so formed at a temperature of about 300° C. to about 800° C. whereby there is obtained substantially pure ferric oxide.

2. A process for producing ferric oxide characterized by a relatively high degree of purity and further possessing the property of being highly reactive with other materials in the production of ferrites which comprises, forming a slurry by immersing in water particles of iron powder of a size of not greater than about 3 microns and produced by the decomposition of iron carbonyl, controlling the temperature of said slurry such that it does not fall below a temperature of about 75° C. nor exceed a temperature of about 95° C., partially oxidizing said iron particles until at least a skin of hydrated oxide is formed substantially about the iron particles by treating said slurry with a gaseous mixture comprised of carbon dioxide and air, the ratio of said carbon dioxide to air by volume being not greater than about 1 to 5 and not less than about 1 to 40 so that when the product thus formed is subjected to a calcining operation detrimental sintering is avoided, and then calcining the product so formed at a temperature of about 350° C. to about 750° C. whereby there is obtained subtantially pure ferrics oxide.

3. A process for producing ferric oxide characterized by a relatively high degree of purity and further possessing the property of being highly reactive with other materials in the production of ferrites which comprises, forming a slurry by immersing particles of iron powder having a mean particle size of not greater than about 6 microns in water maintained at a temperature of at least about 75° C. and up to 95° C., partially oxidizing said particles of iron powder until at least a skin of hydrated oxide is formed substantially about the particles by subjecting said slurry to the action of a gaseous mixture containing carbon dioxide and air, the ratio of carbon dioxide to air by volume being not greater than 1 to 5 and not less than about 1 to 40 so that when the product thus formed is subjected to a calcining operation detrimental sintering is avoided, and then calcining the product so formed at a temperature of about 350° C. to about 800° C. to obtain substantially pure ferric oxide.

4. A process as described in claim 3 wherein the ratio of carbon dioxide to air is not less than 1 to 20.

References Cited in the file of this patent

UNITED STATES PATENTS

| | | |
|---|---|---|
| 927,644 | Doherty | July 13, 1909 |
| 2,045,808 | Smyly | June 30, 1936 |
| 2,127,907 | Fireman | Aug. 23, 1938 |
| 2,785,049 | Whaley | Mar. 12, 1957 |

UNITED STATES PATENT OFFICE
CERTIFICATE OF CORRECTION

Patent No. 3,007,775                          November 7, 1961

David M. Llewelyn et al.

It is hereby certified that error appears in the above numbered patent requiring correction and that the said Letters Patent should read as corrected below.

In the heading to the printed specification, line 8, for "Nov. 14, 1958" read -- Mar. 14, 1958 --; column 2, line 52, for "coarsesr" read -- coarser --; column 3, Table III, under the heading "Final Calcined Product" and sub-heading "Percent C" for "0.14" read -- .014 --.

Signed and sealed this 12th day of June 1962.

(SEAL)
Attest:

ERNEST W. SWIDER
Attesting Officer

DAVID L. LADD
Commissioner of Patents